United States Patent [19]

Matthiasson et al.

[11] Patent Number: 5,250,005
[45] Date of Patent: Oct. 5, 1993

[54] METHOD AND APPARATUS FOR CUTTING AND CLEANSING OF ROUND FISH

[75] Inventors: Asgeir Matthiasson, Kopavogur; Sigurdur Kristinsson, Reykjavik, both of Iceland

[73] Assignee: Jonatan H.F., Reykjavik, Iceland

[21] Appl. No.: 831,309

[22] Filed: Feb. 7, 1992

[30] Foreign Application Priority Data

Feb. 8, 1991 [IS] Iceland ................................... 3674
Dec. 18, 1991 [IS] Iceland ................................... 3793

[51] Int. Cl.⁵ ............................................. A22C 25/14
[52] U.S. Cl. ................................... 452/108; 452/160; 452/170
[58] Field of Search ............... 452/108, 119, 123, 160, 452/161, 163, 179

[56] References Cited

U.S. PATENT DOCUMENTS

| | | | |
|---|---|---|---|
| 3,399,422 | 9/1968 | Hartl et al. | 452/108 |
| 3,510,910 | 5/1970 | Erkins . | |
| 3,838,478 | 10/1974 | Wulff | 452/119 |
| 4,307,491 | 12/1981 | Dafgard | 452/108 |
| 4,599,765 | 7/1986 | Kristinsson | 452/170 |
| 4,979,268 | 12/1990 | Kure | 452/108 |

FOREIGN PATENT DOCUMENTS

| | | | |
|---|---|---|---|
| 501062 | 4/1952 | Belgium | 452/108 |
| 3327968 | 1/1987 | Fed. Rep. of Germany . | |
| 44952 | 5/1922 | Norway | 452/108 |
| 234636 | 1/1969 | U.S.S.R. | 452/108 |
| 254038 | 10/1969 | U.S.S.R. | 452/108 |
| 1486138 | 6/1989 | U.S.S.R. | 452/179 |
| 1358851 | 7/1974 | United Kingdom . | |

*Primary Examiner*—Willis Little
*Attorney, Agent, or Firm*—Cushman, Darby & Cushman

[57] ABSTRACT

A method for automatically cleaning fish such as cod comprises gripping the fish and subsequently cutting it open, first transversely behind the head from the belly of the fish and subsequently in its longitudinal direction along the belly, and finally removing the entrails. The method is characterized in that the fish is gripped in its eye sockets with its belly upwards and being held rotatably substantially about an axis extending therethrough, that the fish is displaced parallel to its axis and is moved with its back supported towards a chin lifting means, which presses the head of the fish backwards, and past a throat cutting means for cutting the fish transversely, that the fish is then turned and moved further head foremost and belly upwards and further round along a curved descending path, that the fish is thereby bent backwards and moved into engagement with a belly distending means which during continued forward movement of the fish passes into the fish along the inside of the belly, and with a knife which in immediate connection to the belly distending means cuts open the belly longitudinally, that the fish is then moved further hanging down freely with the cut open belly facing forwards, and that the entrails are then pulled out by pulling the fish over an entrails scraping means.

15 Claims, 16 Drawing Sheets

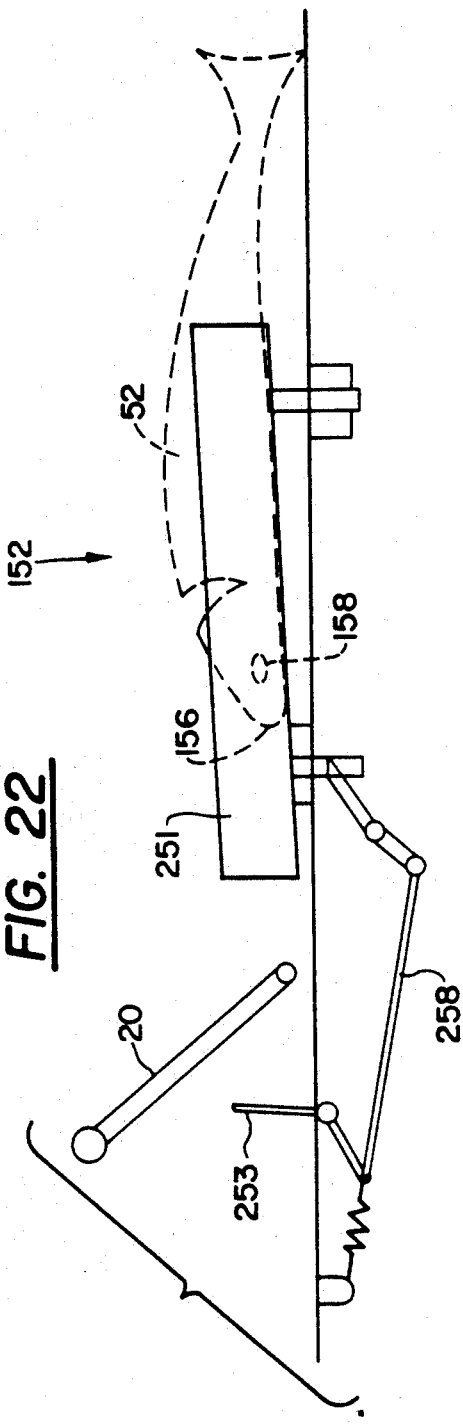
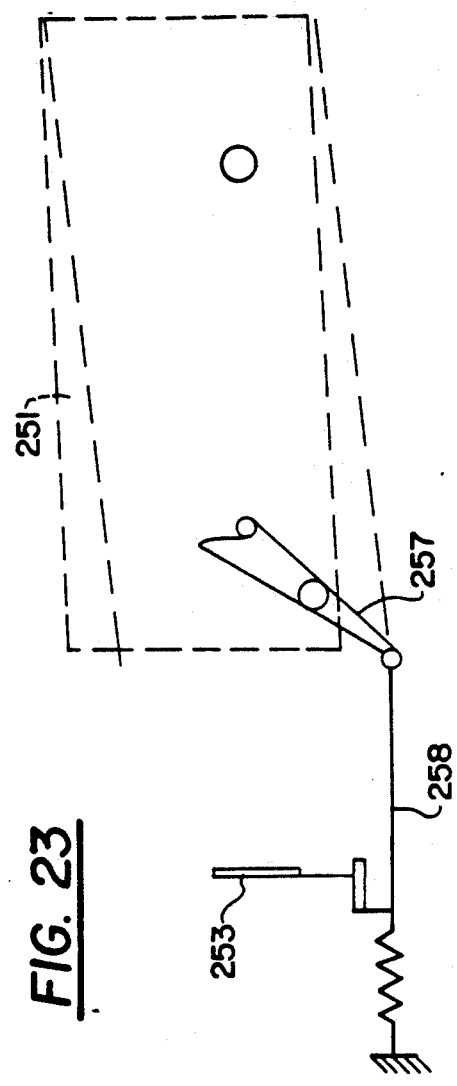

METHOD AND APPARATUS FOR CUTTING AND CLEANSING OF ROUND FISH

The invention relates to an apparatus and a method for automatically cleaning roundfish, i.e. fish having a substantially round cross-section, such as cod, where the fish is gripped and subsequently cut open, first transversely behind the head from the belly of the fish and subsequently longitudinally to the belly, where finally the entrails are removed.

At present the cleaning of fish is carried out on board fishing ships to a large extent. This cleaning (cutting the throat and removing the entrails) has for a long time been done manually. In recent years, however, machines and equipment designed to take over this energy and time-consuming manual work have become available. These machines have been designed for throat and belly cutting and removal of entrails in one and the same operation. It is the general opinion that a satisfactory result has not been achieved. Throat cutting, i.e. the cutting of the throat and throat tendons, stomach cutting transversely to the stomach, and especially cutting open the belly in the longitudinal direction, i.e. cutting open the fish from the throat backwards to the vent, have not been performed sufficiently accurately with this equipment, however, it is extremely important that this cutting is done properly, as it affects the quality of the fish to a great extent. If the fish is cut open incorrectly, the fish meat may be spoiled and the price of the fish decreases. Furthermore this may affect the possibilities of processing the fish entrails further. The fish should be cut open transversely to the throat, i.e. at right angles to the longitudinal axis of the fish, and longitudinally to its belly.

Reference is made to the following patents: U.S. Pat. Nos. 3,510,910 and 4,979,268, German patent No. 3,327,968 and GB patent No. 1,358,851 describing apparatuses and methods of this kind.

Cutting the throat of a fish and removing its entrails manually is time-consuming work. It is assumed that a well-trained person can manage 5-7 fish per minute when working constantly. In reality, this means a maximum of 3-4 fish per minute. The invention described in the following relates to an apparatus and a method for throat cutting, i.e. cutting the throat and stomach, and belly cutting, i.e. cutting open the fish from the throat backwards to the vent, and scraping out the entrails non-manually. The fish is inserted in the apparatus head first and belly upwards, it is gripped in its eye hollows and thus pulled through the machine. Firstly, it is guided transversely to its longitudinal axis past a device which cuts the throat and the throat tendons, and then it is turned 90° in an eye hollow holder head first and belly upwards. Then the fish belly is cut open right back to the fish vent with a belly cutting knife and finally the entrails are cleaned and cut off before the fish falls out of the machine for further processing.

By means of this method and the apparatus described below it will be possible to process up to 20-30 fish per minute.

The object of the invention is to provide an apparatus and a method for cutting the throat of a fish and removing the entrails from a fish, such as cod, of different size, said method and apparatus being both simple and quick and able to perform accurate throat cutting, belly cutting and cleaning of entrails without requiring adjustment or rearrangement of knives or other devices and in such a manner that the best possible quality is obtained.

This object of the invention is obtained by the apparatuses and methods disclosed in the characterizing clauses of the claims, claims 1-15.

The invention will be further described with reference to the attached drawings, wherein FIG. 1 is a side view of an embodiment of the apparatus, FIG. 2 is a side view of a second embodiment of the apparatus, FIG. 3 shows an embodiment of the insertion means and the throat cutting means, FIG. 4 shows an embodiment of the throat and neck cutting means, FIG. 5 shows the movement of the throat and neck cutting means, FIG. 6 shows the fish gripping means, FIG. 7 shows the fish gripping and insertion means, FIG. 8 shows the arrangement of the fish during belly cutting and evisceration of the entrails, FIG. 9 shows the arrangement of the fish relative to the belly cutting means and the entrails scraping means, FIG. 10 shows the entrails scraping means, FIG. 11 shows the feeding channel, FIG. 12 shows the end of the entrails scraper, FIGS. 13-17 shows the movement of the entrails scraping means, FIGS. 18-21 shows the movement of the entrails scraping means in relation to the fish conveyed through the apparatus, FIGS. 22-23 shows the feeding channel, and FIG. 24 shows entrails scraping means.

FIGS. 1 and 2 show the main features of an embodiment of the apparatus comprising an endless chain 15, which is rotated around two sprocket wheels 16, 17 and upwardly forms an almost horizontal conveyor belt. A holding and clamping device (saddle) 2 is attached to the chain, and when the chain is moved forwards by means of an electric engine, said holding and clamping device is inserted into the insertion means 3, where the holding and clamping device grips a fish through the eyes and holds it in the eye hollows and pulls is further through the machine. First, the fish is pulled with its belly upwards transversely to its longitudinal axis, said fish being supported by a rest 71, which is placed immediately behind the holding and clamping device (saddle) 2 at the middle of the fish, and the fish is pulled past a throat cutting knife 4, a membrane knife 5 and a swimming bladder knife 7. When the throat cutting has been performed, the fish is turned by a 90° turning of the saddle around a pivot 6, so that the head of the fish is facing forwards and the belly upwards, and the fish is pulled further by the conveyor belt and is turned around a sprocket wheel 17 so that its belly falls down into a channel 9 and is guided towards a belly cutting knife 10, which distends the belly and cuts it open from the throat backwards to the vent, whereupon the fish is pulled further to an entrails scraper 11, 100, which scrapes the entrails out of the belly of the fish and cuts the entrails off the fish before the holding and clamping device approaches a saddle opener 13 and a detachment device 14 which release the fish from the holding and clamping device (saddle), so that the saddle can be moved further with the conveyor belt and receive a new fish for processing.

FIG. 2 shows an embodiment of the entrails scraping means 11 which is slightly different from the means shown in FIG. 1.

FIG. 3 shows an embodiment of the insertion means 3 and the throat cutting knives 4, 5, 7. The insertion means 3 substantially comprises the following components: an arm 20 with an eye hook 21 at the end. The eye hook 21 penetrates the eye of the fish as soon as the fish is guided into the insertion means and the eye pin 22 of the saddle penetrates the eye of the fish and closes above the eye hooks. The back plate and holding plate 19, 25 guide the fish into the insertion rest. The holding plate 25 is elevated when the fish is pulled transversely forwards. A separate opener 26 opens the lock of the holding plate. When the saddle is pulled further through the holding plate, said holding plate is raised and a guiding device 27 is guided towards a guiding pin 29 for the elevating rod 30 which at the same time lifts the cutting device 4, said cutting device revolving around a shaft 32 on a base 31. The elevating rod 30 depresses the chin of the fish while at the same time guiding the movement of the fish towards the throat cutting device 38-41 where the throat of the fish is cut, and the fish is pulled further to a movable, oblong and curved flat knife 5, (membrane cutter), which cuts further down into the membranes and stomach of the fish. The membrane cutter having a sharp edge 37 cuts the membranes in the throat of the fish, and the stomach is raised by a stomach pin 43, and a stomach knife 44 makes a cut transversely to the stomach, whereupon a membrane loosener 45 assists by loosening membranes during the cutting. Parallel to the elevating rod 30 there is a neck plane 42 on which the back of the neck of the fish is supported right behind the neck and which presses that part of the fish upwards at the throat cut. The so-called elevating rod 30 is made to abut on the chin of the fish thereby guiding the throat cutting knives exactly at the correct height towards the throat of the fish.

FIG. 4 shows an embodiment of the throat knife. The knife is placed on an elevating rod 30, which can be moved up and down on arms 33. The throat knife 39 can be turned around a shaft 50. The knife end 47 is moved beneath the foremost point of the belly of the fish, and the edge of the knife cuts open the neck. A so-called lapwing 40 with a revolving arm 41 is mounted on the elevating rod with a pivot point 49 in the same plane as the knife. A guide pin 147 sliding along a surface 46 on the guiding track 48, which is attached to the cutting knife, controls the opening of the knife (vide FIG. 5). By this design of the knife it is achieved that the throat is cut open in such a way that other parts of the neck are not cut.

FIG. 5 shows how the cutting knife and the lapwing interact when being moved and turned, when the throat cutting takes place.

FIG. 6 shows the design of the saddle 2, the saddle pin 67 and a closing device 66,68 as well as its base 69, 70, and behind this the supports 71 which support the fish, when it is conveyed longitudinally before and during the belly cutting.

FIG. 7 shows the design of the insertion means 3 interacting with the locking device 2.

FIG. 8 shows a fish 52 fastened in the holding and clamping means 2 through the eye 53. The fish is supported at the back of the neck by a neck plate or rail 42 which lifts the back of the neck and pushes the back of the neck against the cutting knives which are used for the throat cutting. When the fish is moved past the cutting knives, the rest or the rod 71 abuts on the side of the fish, as the movement of the fish is coordinated with the movement of the saddle 2. The elevating rod 30 abuts on the chin of the fish so that the throat knife 4 which is placed at the end of a rod 33 which can be raised, can cut the throat 54, and the subsequent membrane knife can cut the membranes further down the throat.

FIG. 9 shows a fish 52 which is fastened in the saddle 2 through the eye of the fish 53, and the fish is placed in a guiding channel 9 at one end of the sprocket wheel 17. The throat 54 is cut open, so that the belly is open in front, so that the end 55 of the belly pin 57 can be guided into the belly of the fish, and the belly knife 56 can cut open the belly of the fish when the fish is being conveyed further. When the pin is guided into the belly opening, said pin is lifted at the same time. The fish is then pulled further along the belly cutting pin and the stomach of the fish is distended at the same time as the fish is pulled further past an entrails scraping means 100 which scrapes out the entrails of the fish and finally past a device which loosens the entrails from the fish.

FIG. 10 shows the entrails scraping means 100 comprising a U-shaped arm, the so-called entrails scraper 111 joined at the end 105. A pair of inner arms or knives 106 (as well as a pair of outer arms 107 which is not shown in this figure) are embracing the entrails scraper. The end of the entrails scraper 105 can be turned around a joint mechanism 113 and on the inside end it is provided with cutting edges. The arms are connected to a base 161 where the entrails scraper can be turned in a horizontal plane, whereas both the inner and outer arms can be turned in a horizontal and vertical direction The entrails scraping means 100 is futhermore provided with an adjusting mechanism so that, the insertion of the entrails scraping means into the belly of the fish is adjusted automatically according to the size of the fish. Generally the adjusting mechanism operates in the following way: A curved guiding channel 171 is placed on the holding and clamping device 2. When the curved guiding channel passes below a guiding and lifting arm 172 and is thrown into mesh with it, said guiding channel is lifted further via a number of arms and raises the entrails scraper. A size adjusting device 179, which is connected to a locking member 156, is opened when the nose of the fish lifts the adjusting device below an adjusting arm 173 so as to delay the coupling of the lifting arm 172 to the arm mechanism and thereby delay the lifting of the entrails scraper.

FIG. 11 and FIGS. 22-23 show feeding channels 251 for guiding the fish towards the eye hook 21 at the end of the guiding arm 20. The fish is placed in the guiding channel head first and belly upwards. The fish is guided along the channel past the eye hook, until its nose abuts on the locking gate 253 which opens a lock connected to the channel so that it may be turned towards the eye hook and the eye of the fish may be brought into engagement therewith.

FIG. 12 shows the end 105 of the entrails scraper 111 and its inside V-shaped cutting edge 104.

Figure 1:
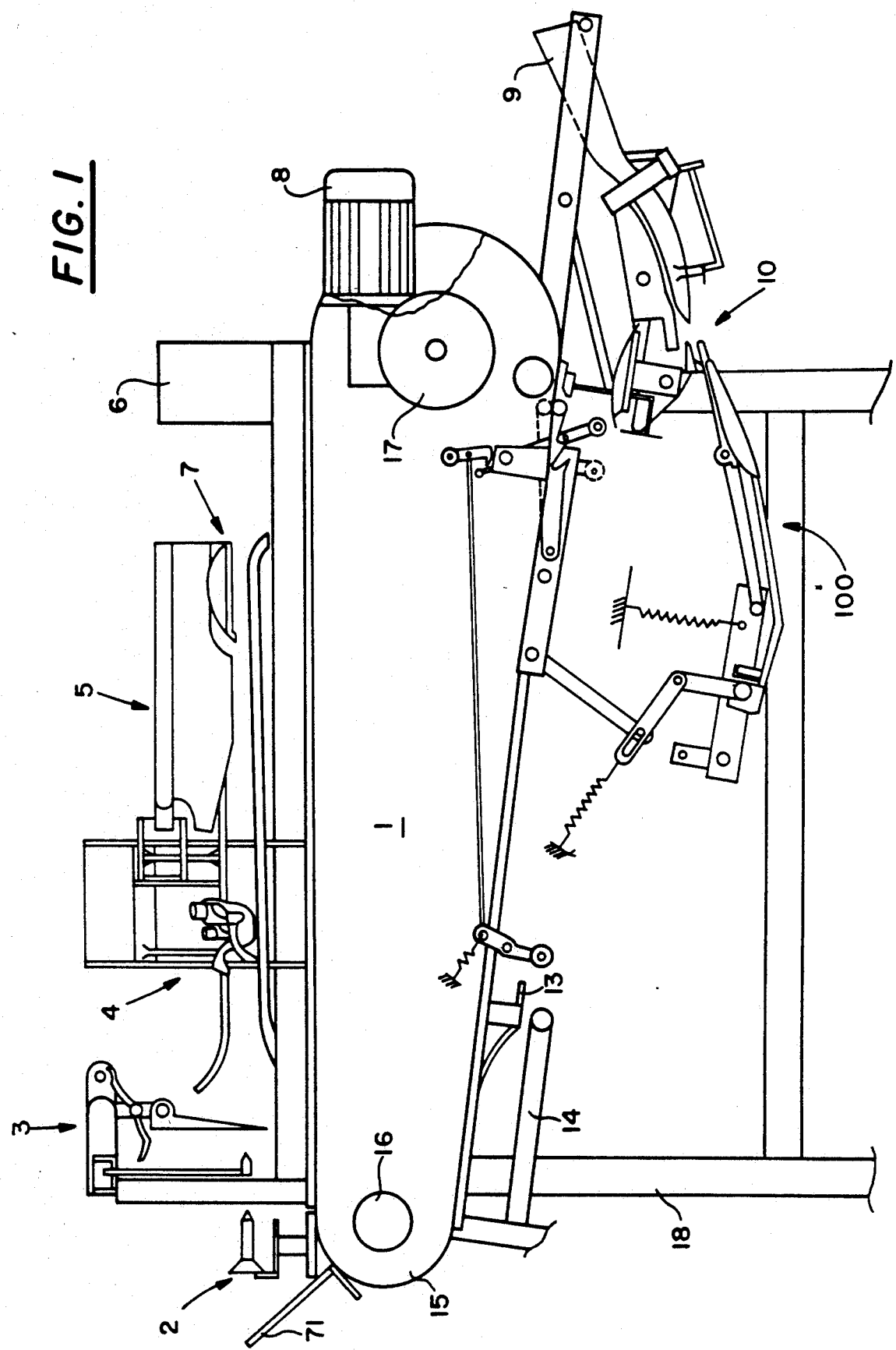
Figure 2:
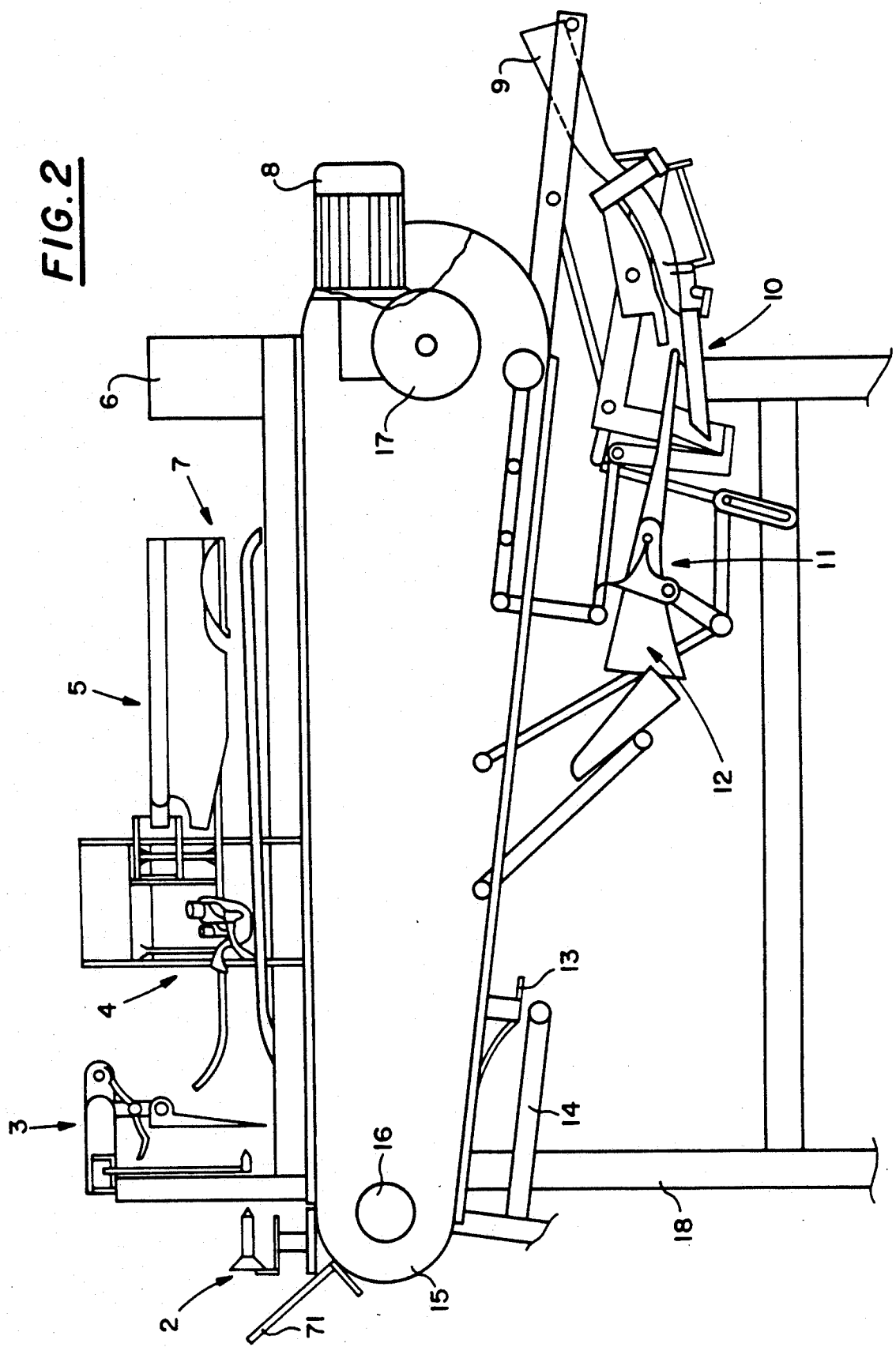
Figure 3:
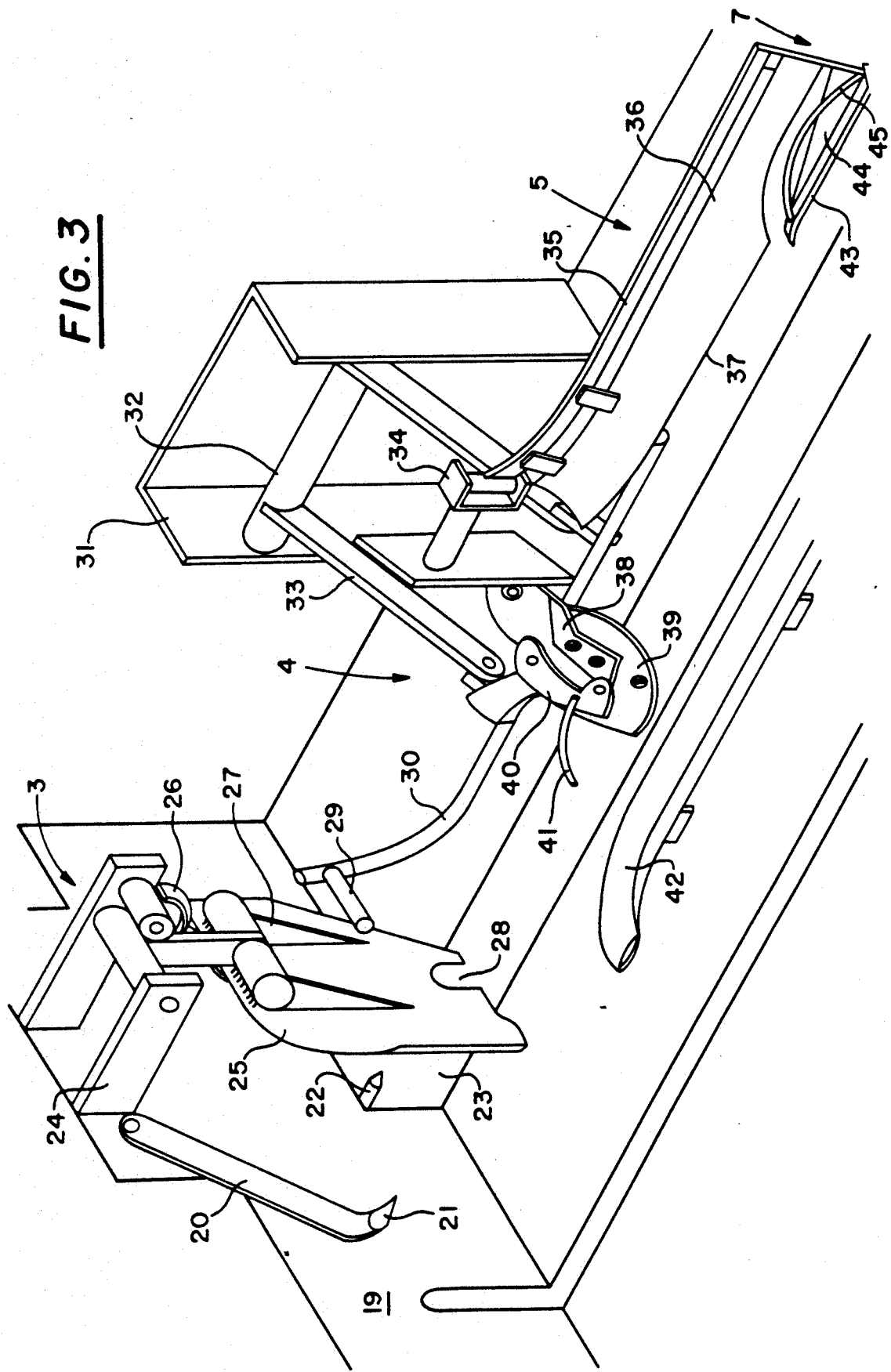
Figure 4:
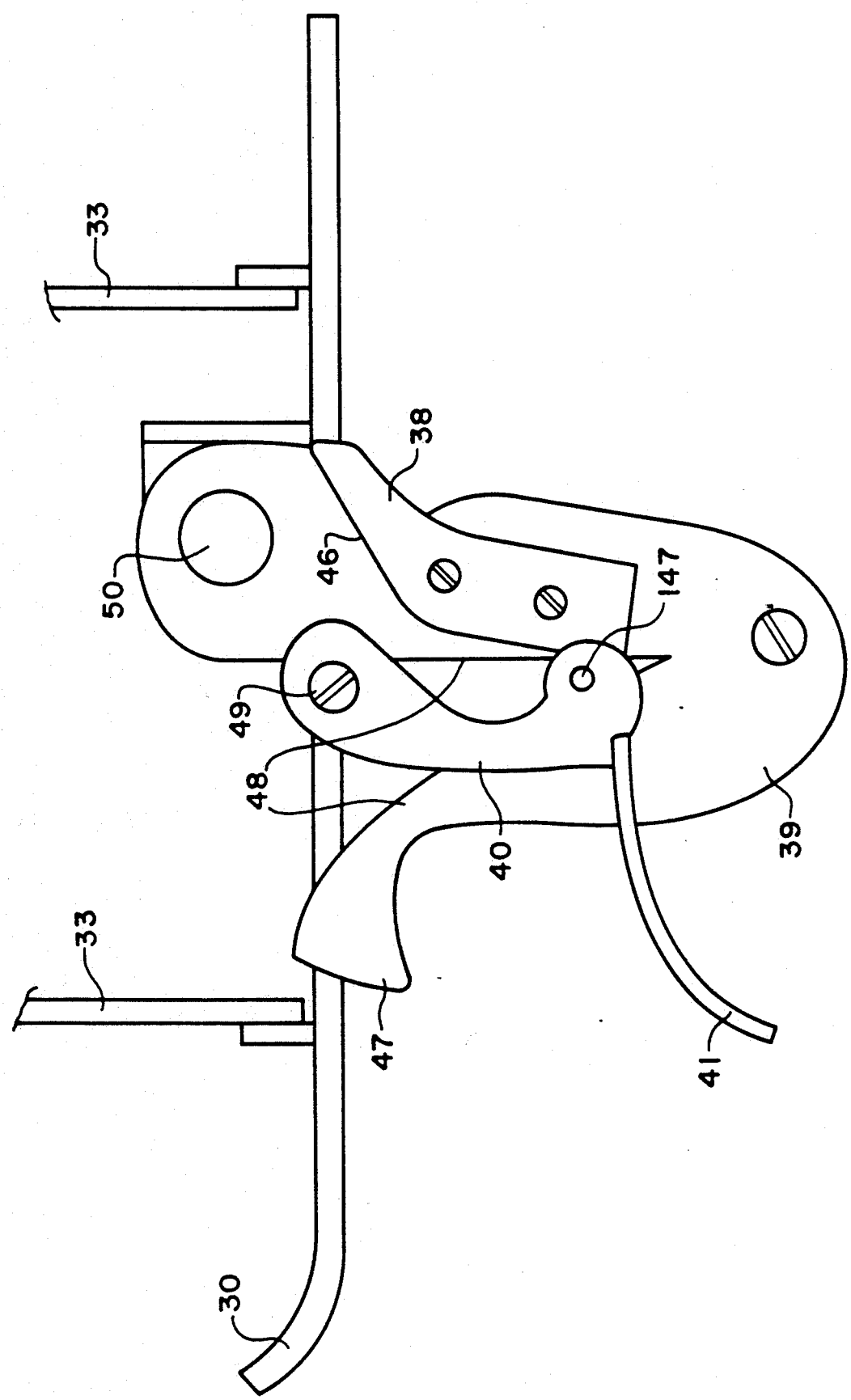
Figure 5:
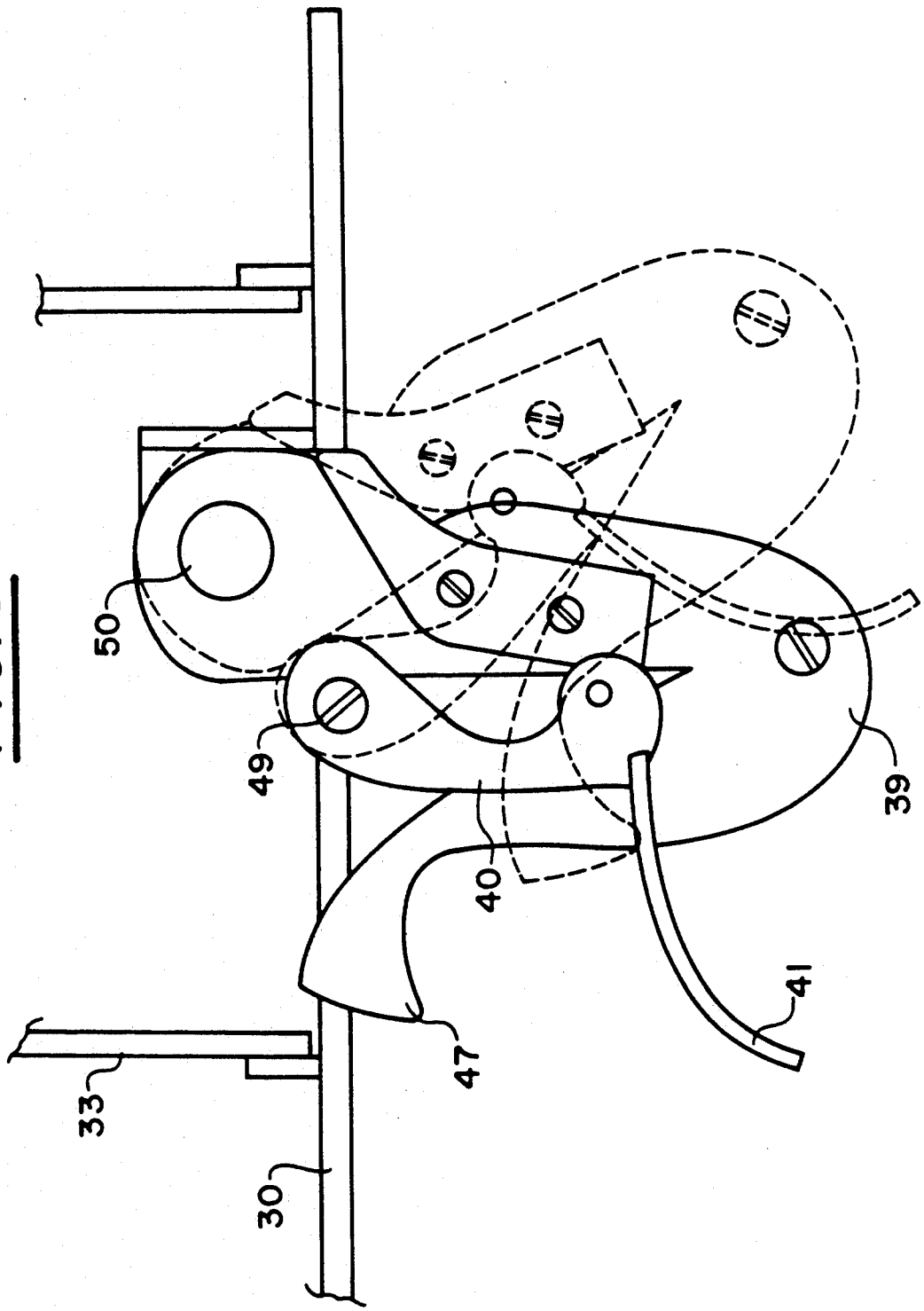
Figure 6:
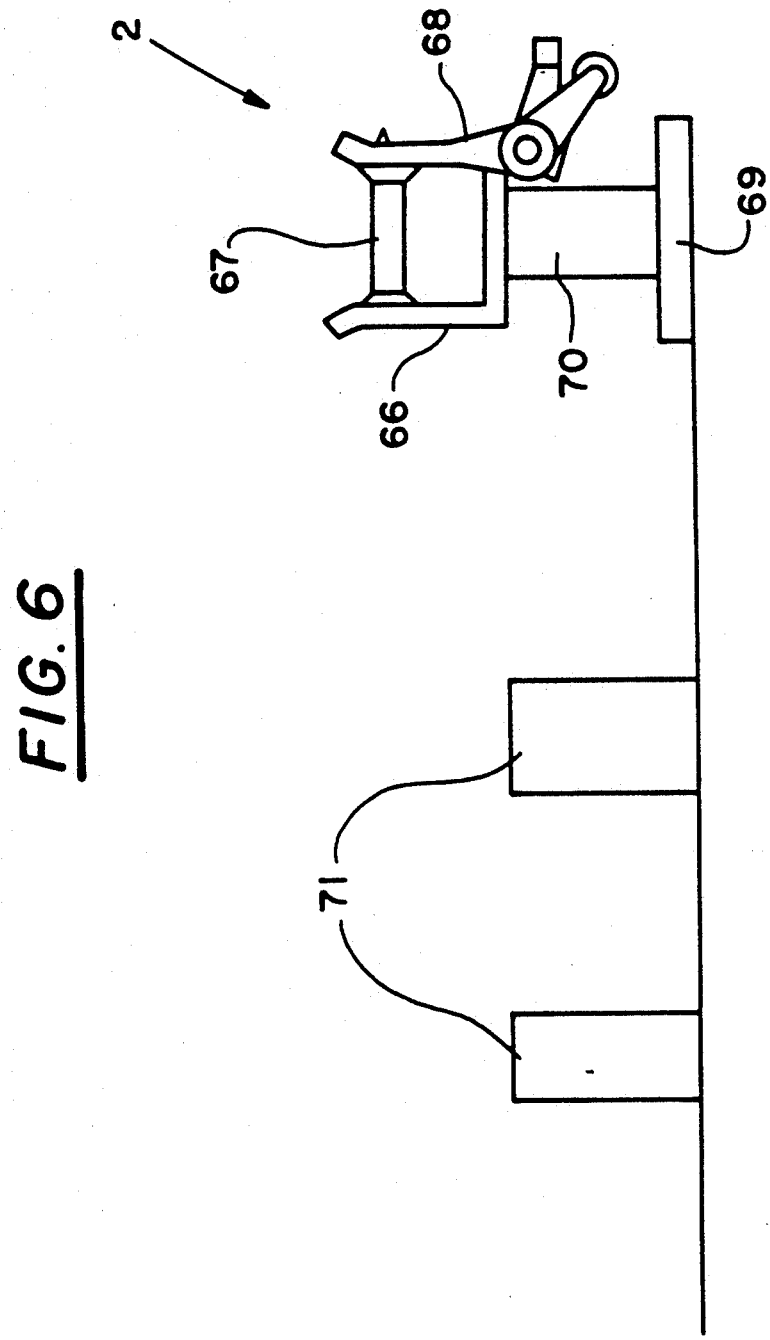
Figure 7:
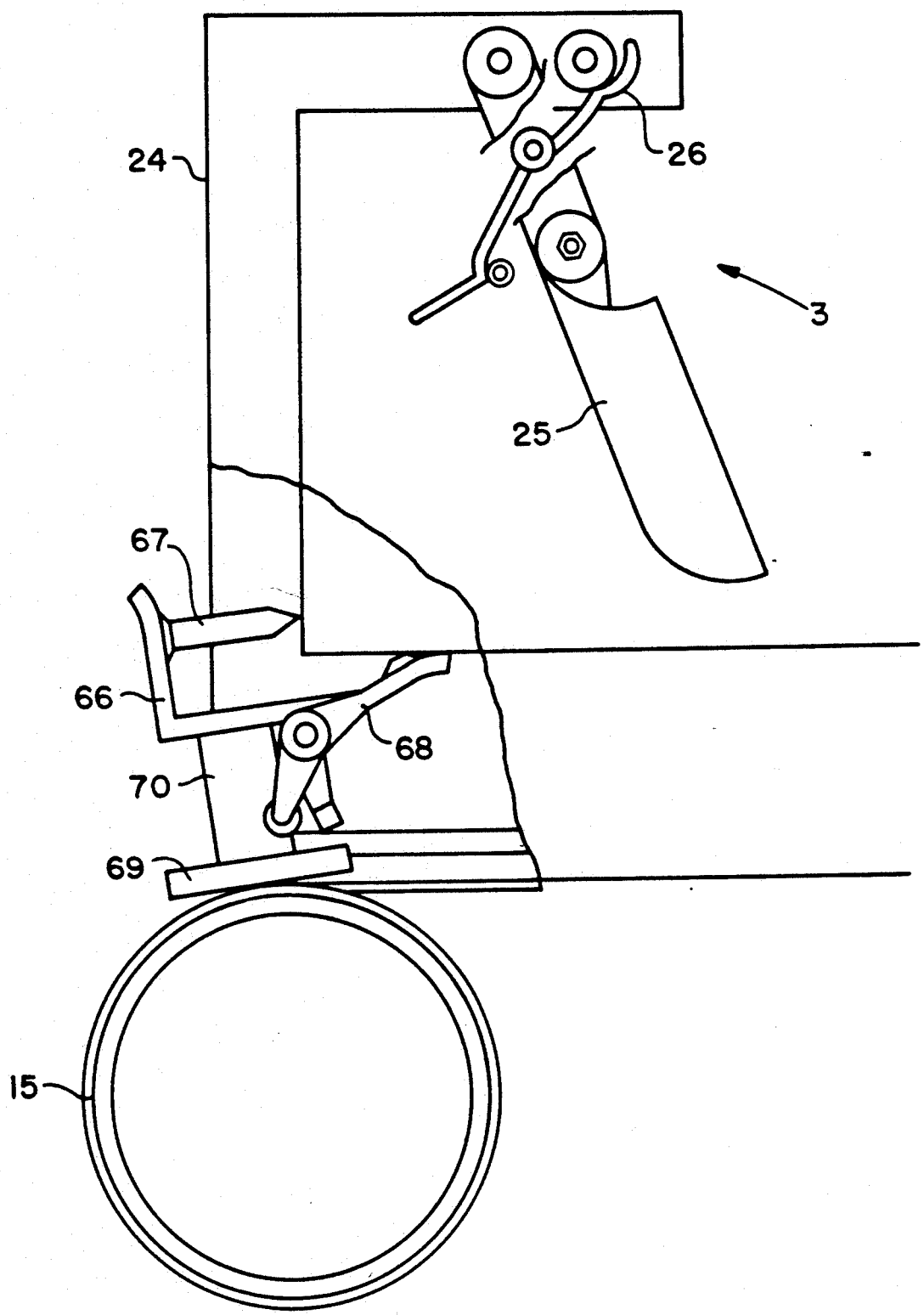
Figure 8:
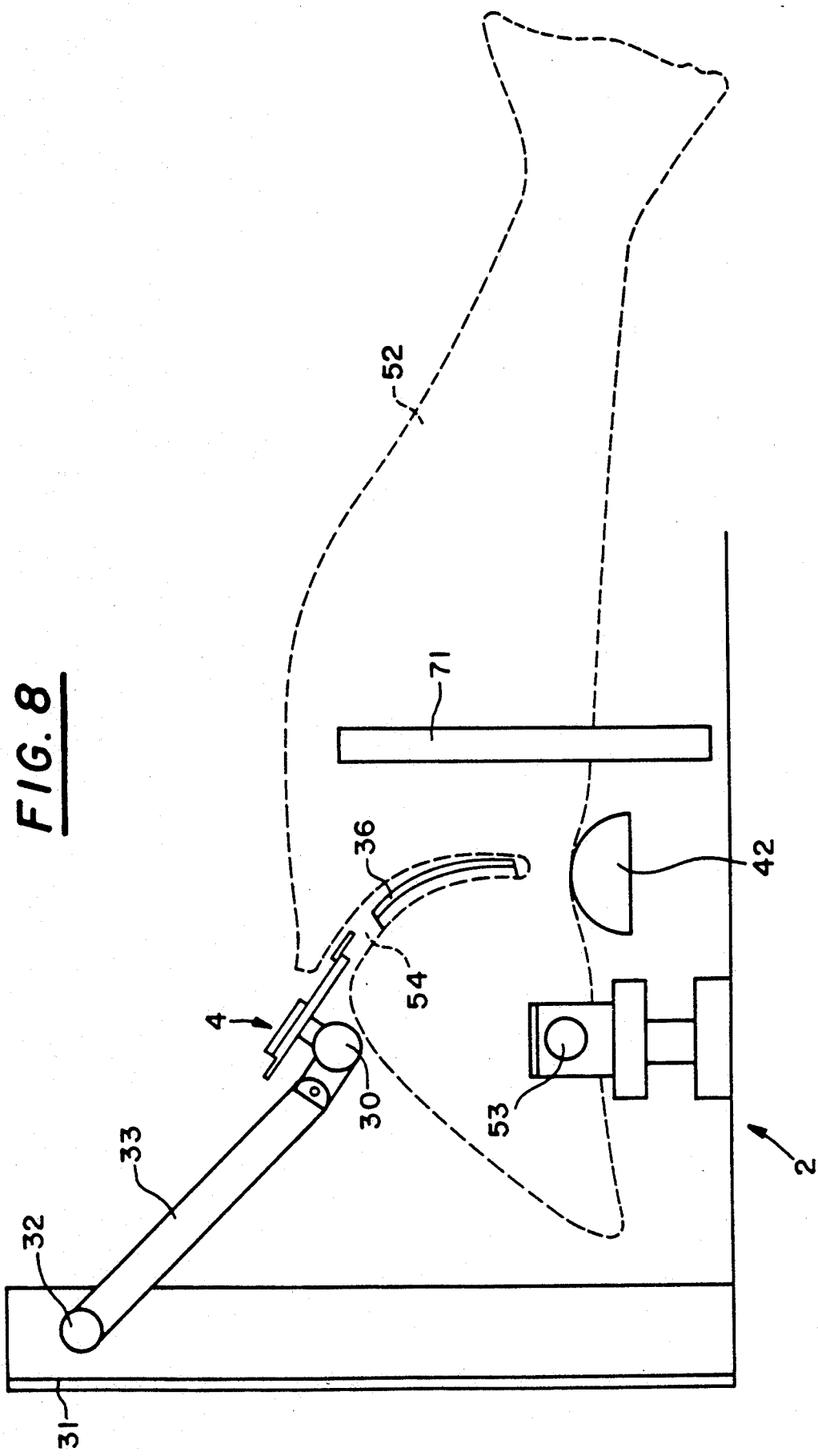
Figure 9:
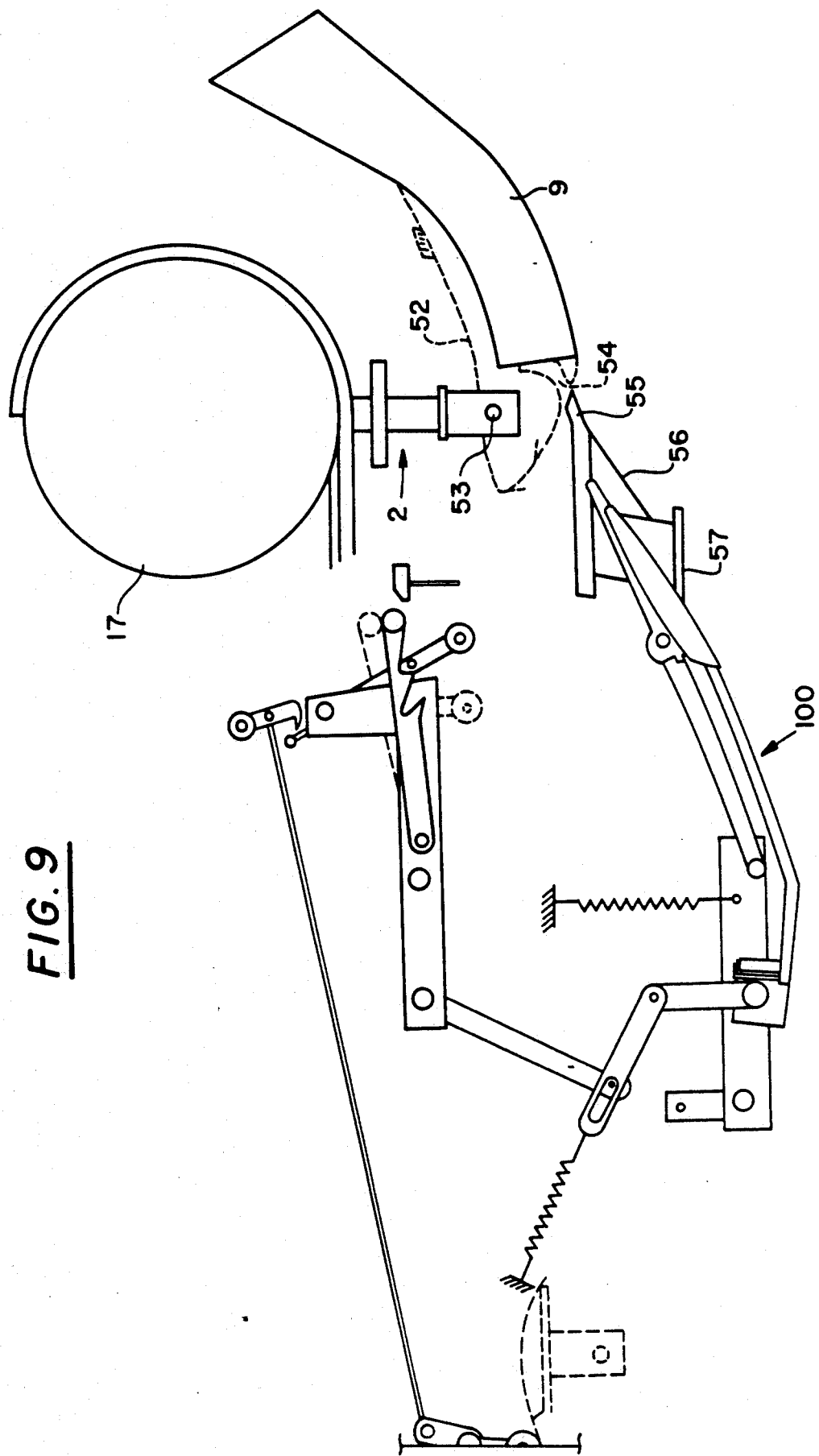
Figure 10:
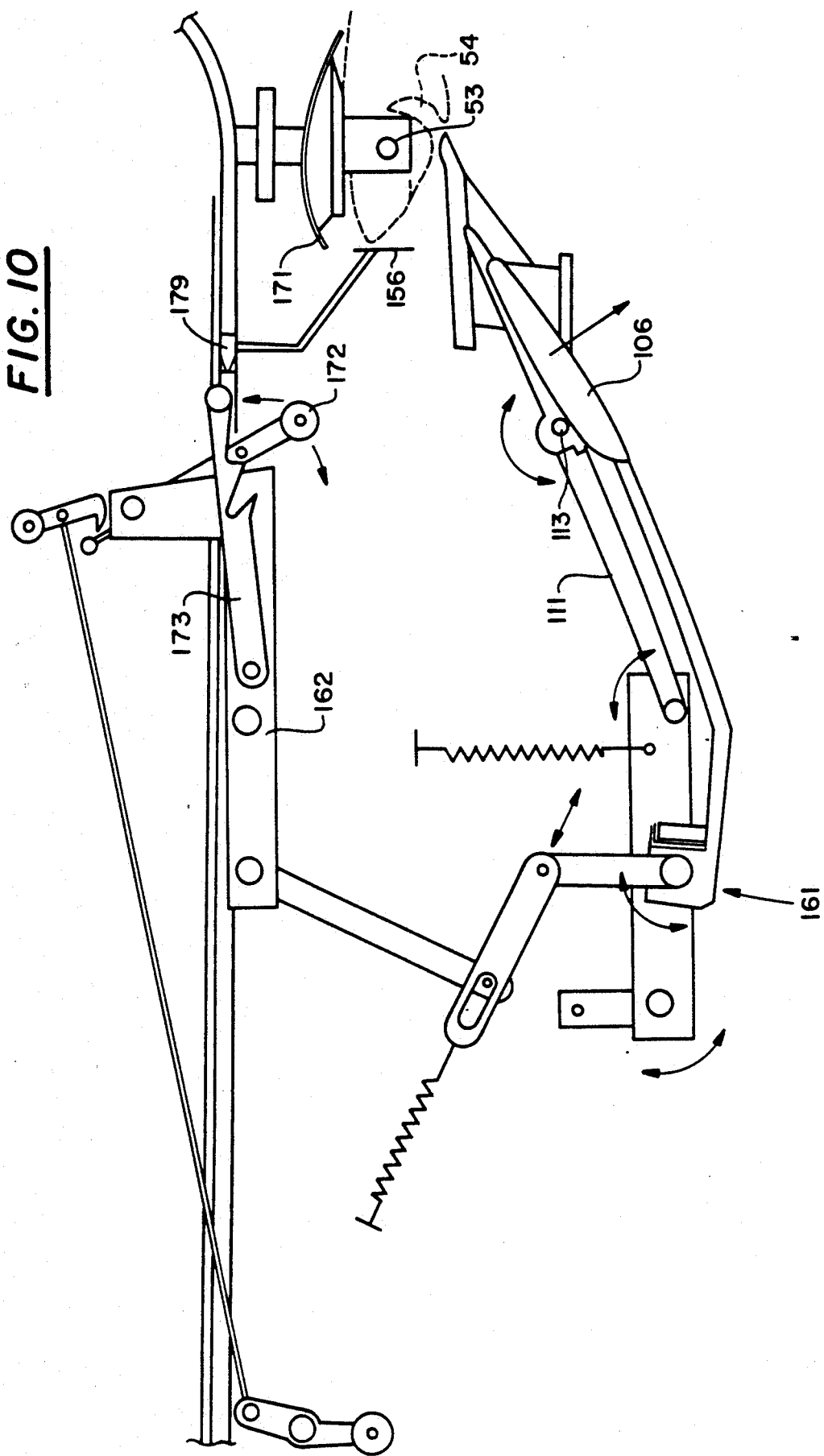
Figure 11:
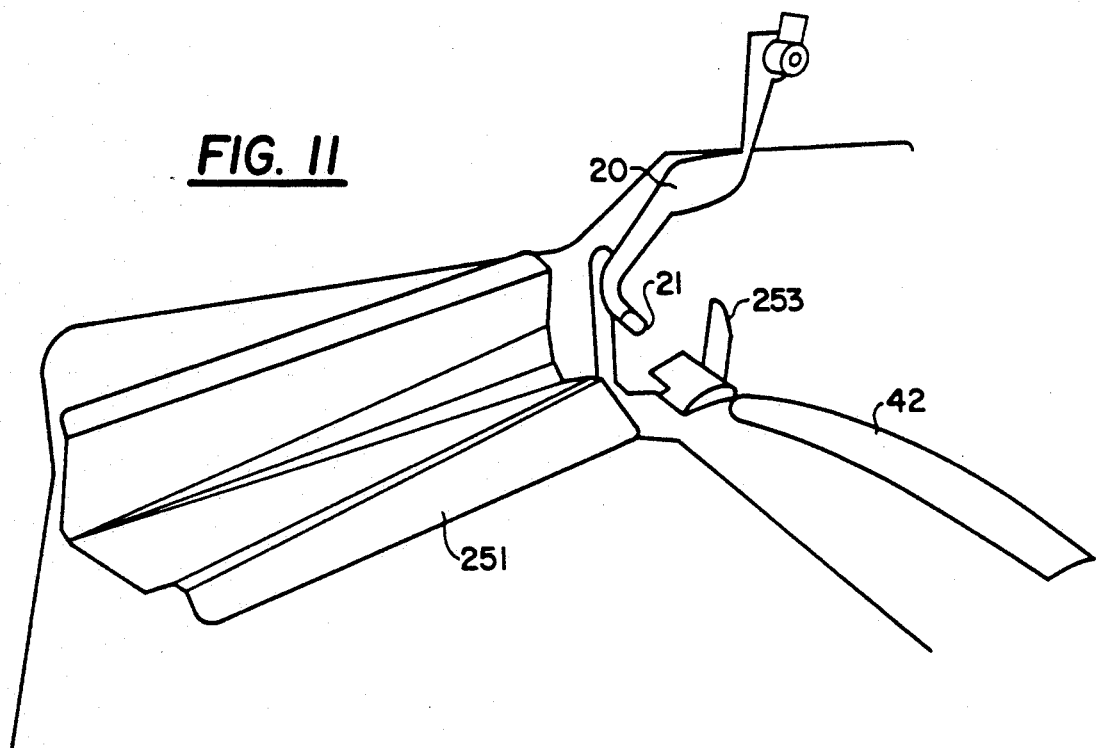
Figure 12:
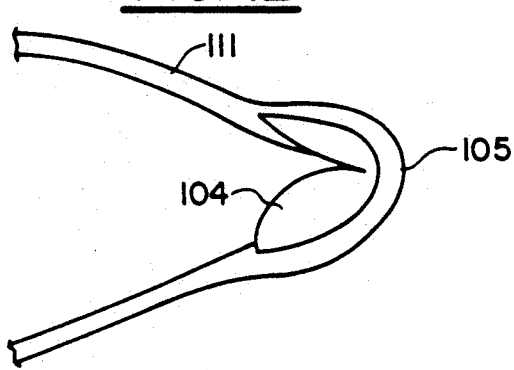
Figure 13:
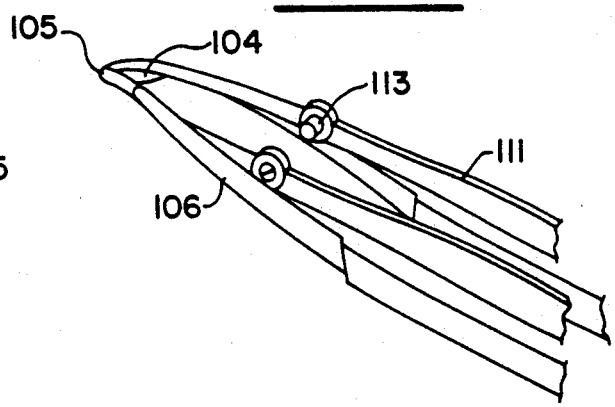
FIGS. 13-17 show the movements of the entrails scraper in relation to the inner and outer arms.
Figure 14:
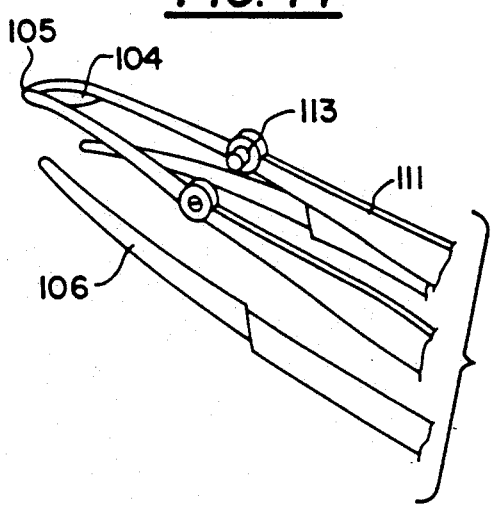
Figure 15:
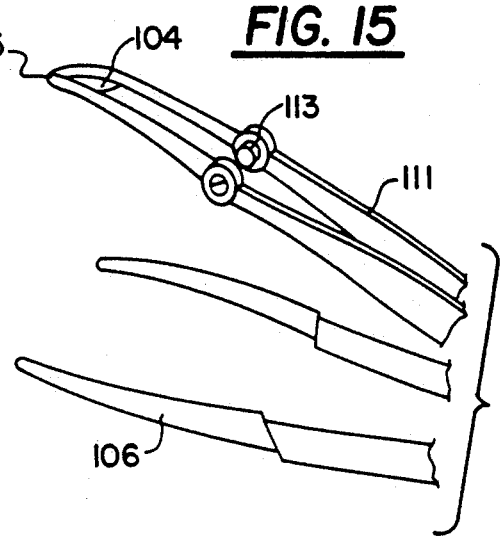
Figure 16:
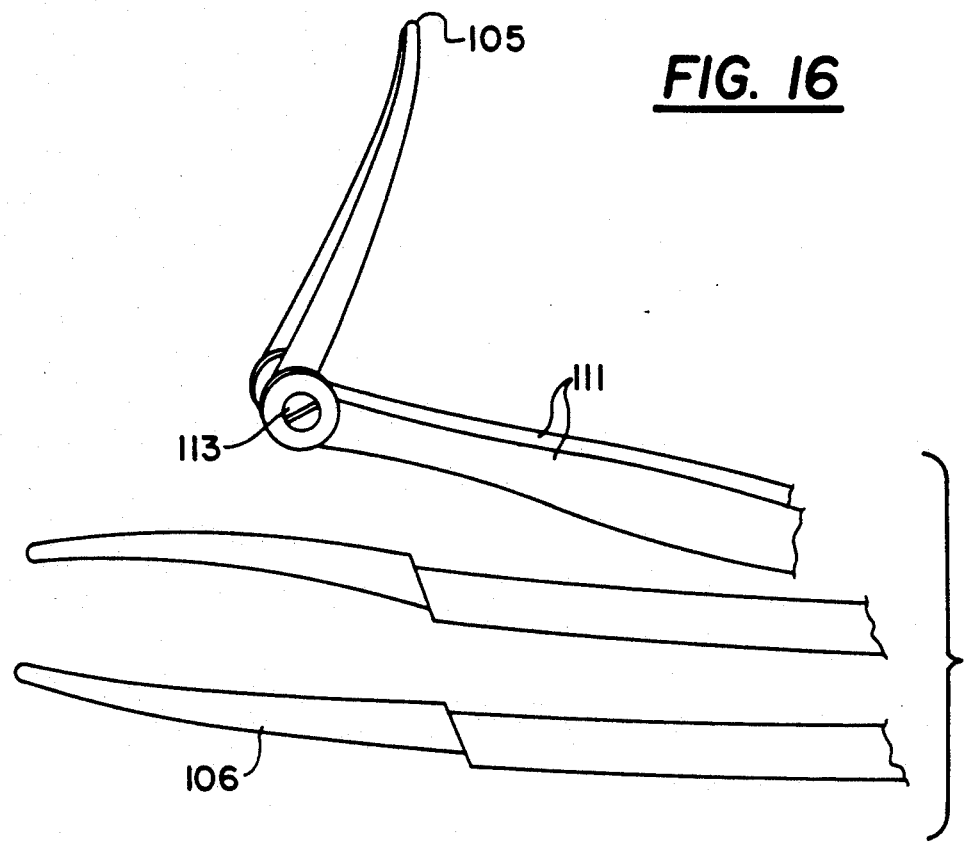
Figure 17:
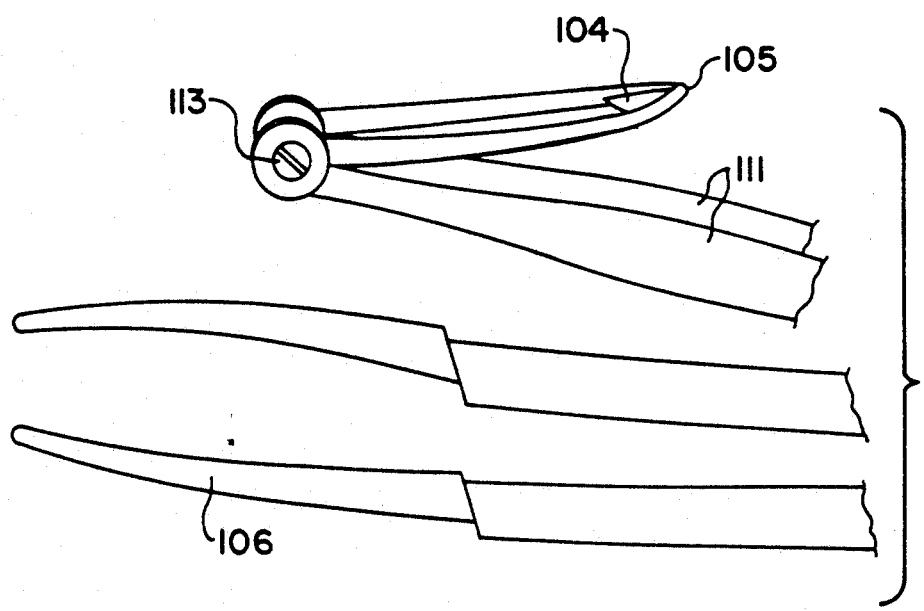
Figure 18:
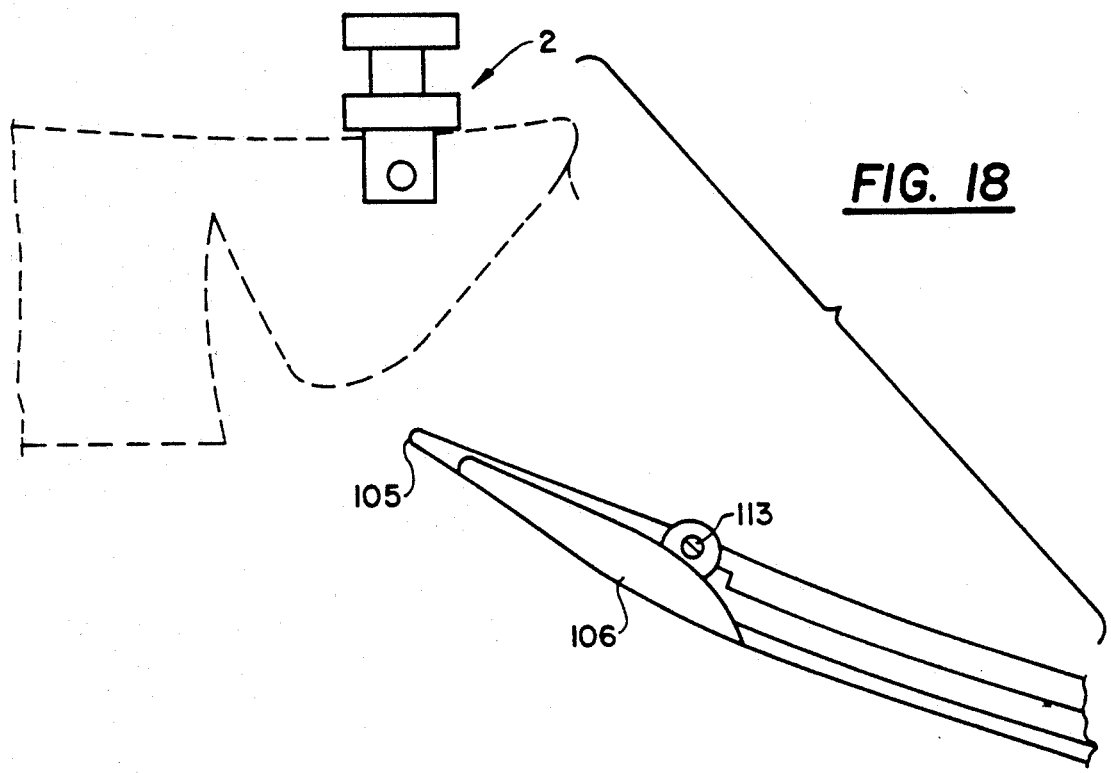
FIGS. 18-21 show the position of the entrails scraper in relation to the fish during its passage through the fish and its movement and evisceration of the entrails.
Figure 19:
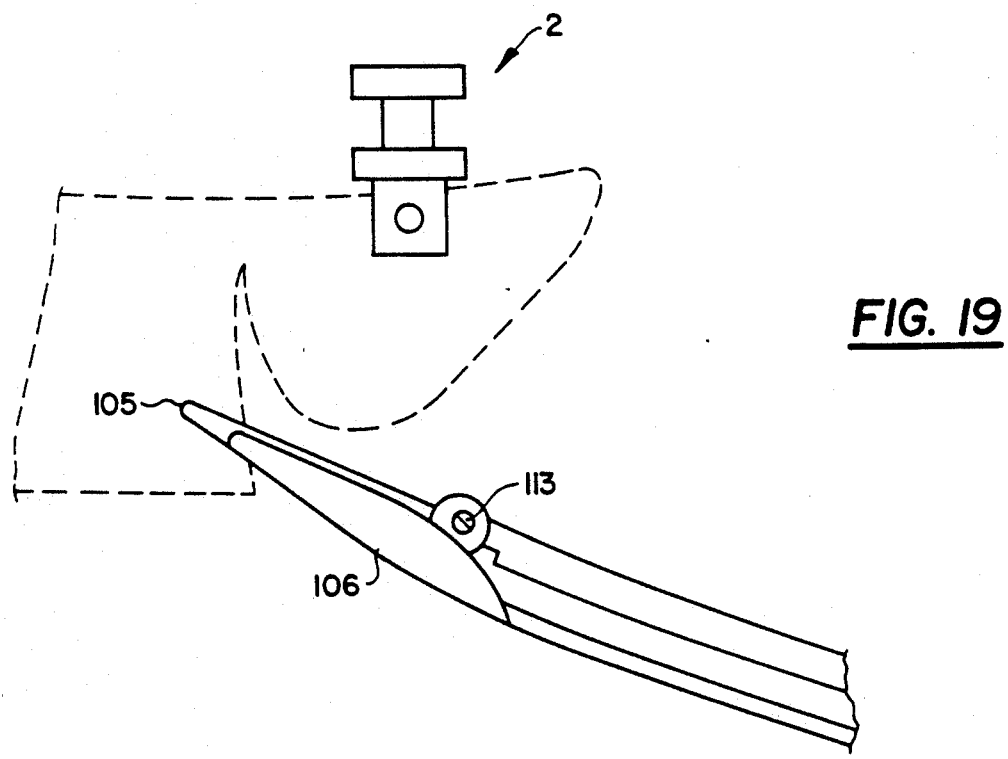
Figure 20:
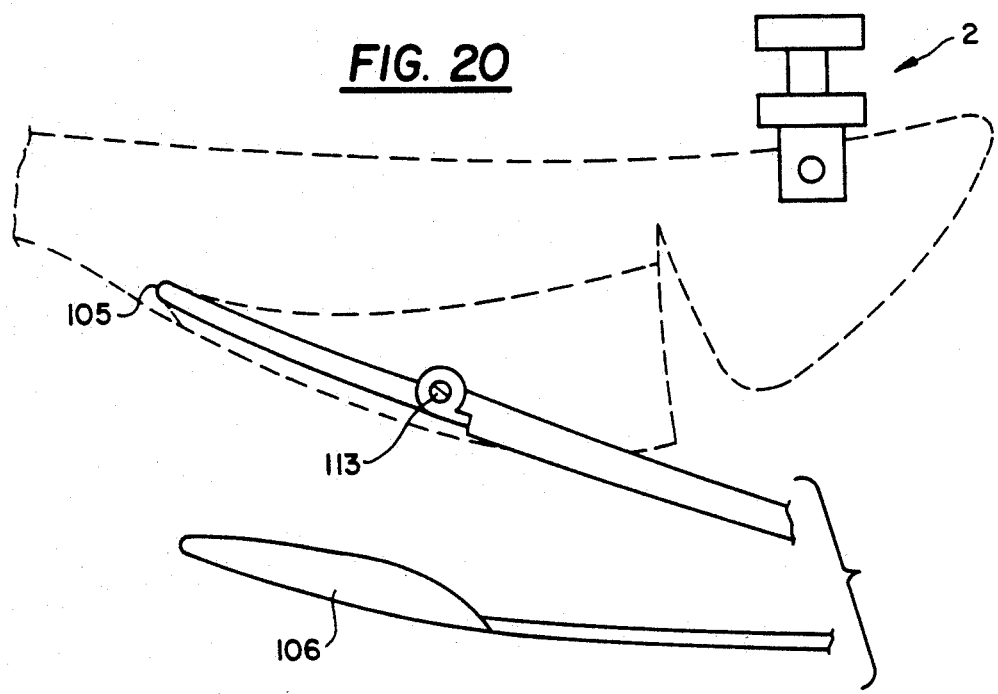
Figure 21:
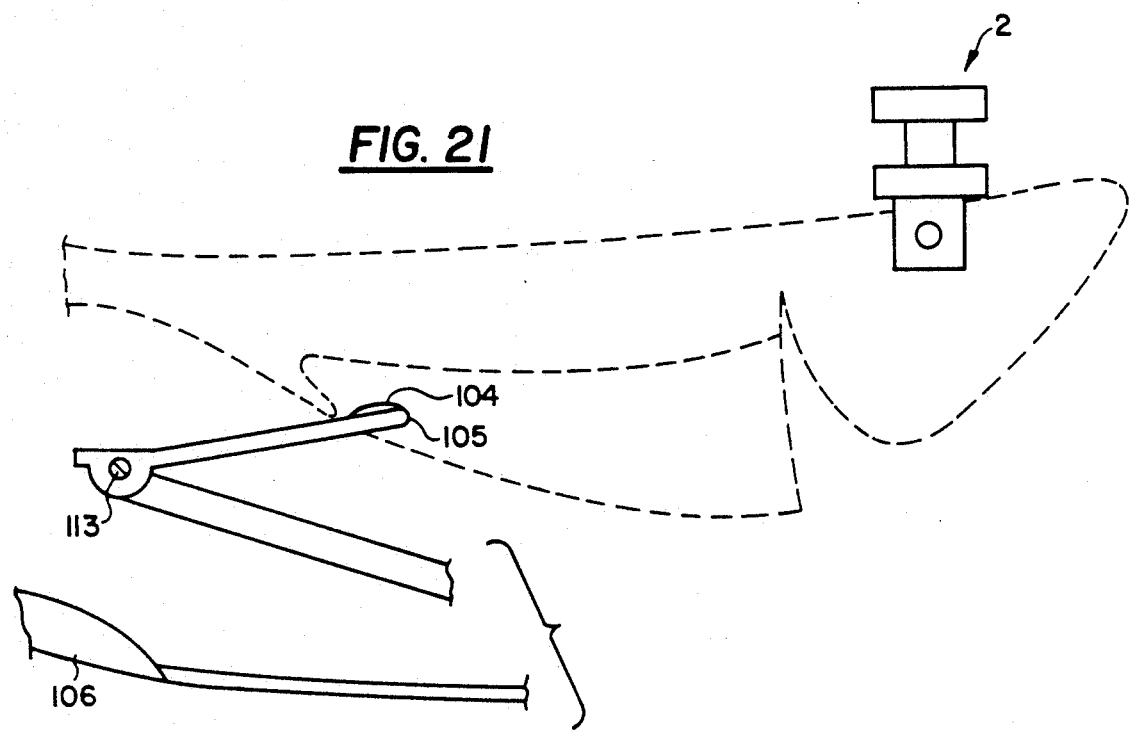
Figure 24:
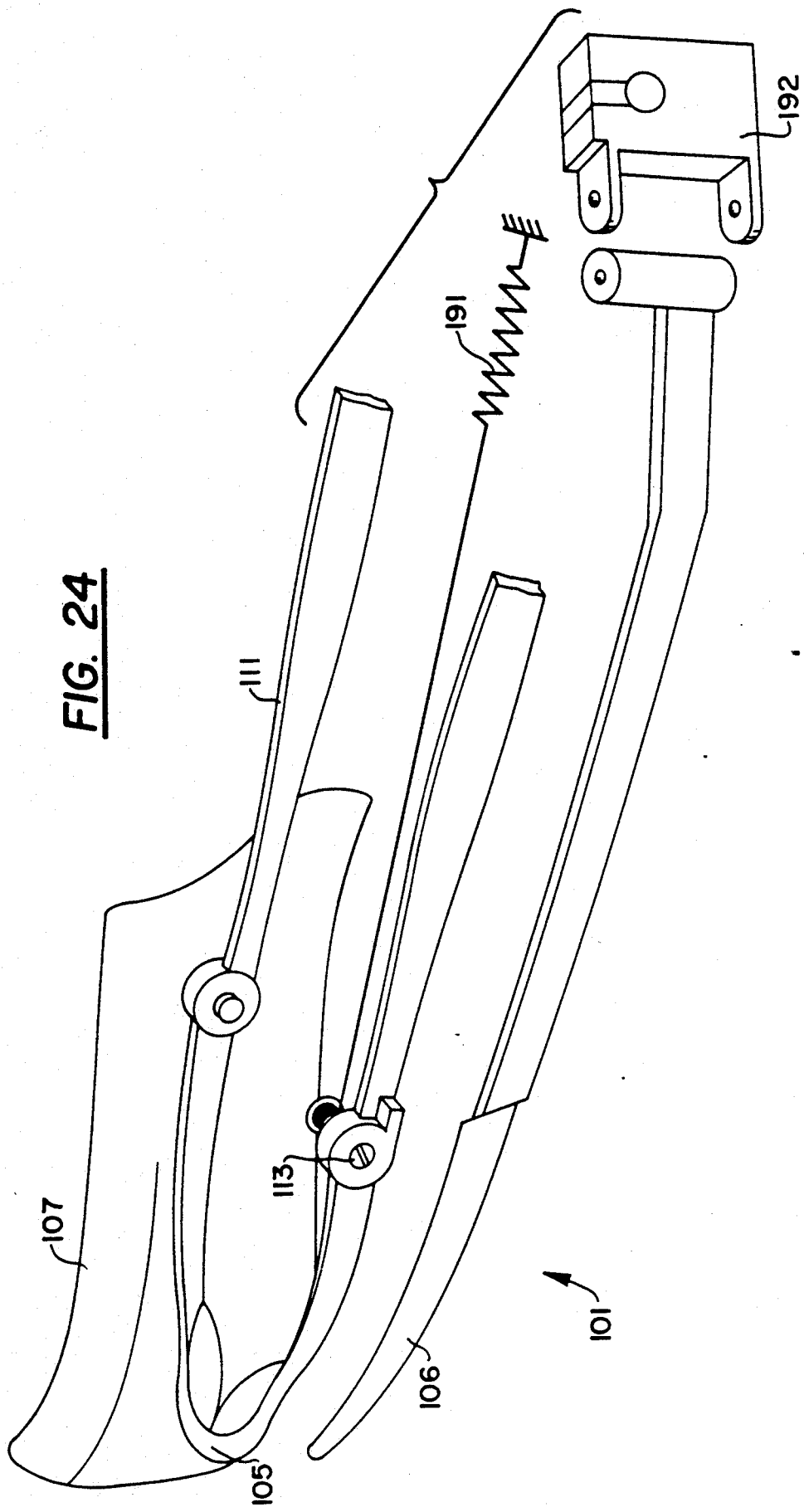
FIG. 24 shows the entrails scraper, the inner and outer arms as well as the supporting plate 107 which is provided with outer arms for supporting the outer sides of the belly at the downward and outward movement of the knives.

The invention described above can be carried out in many different ways without deviating in principle from the basic idea. As an example it can be mentioned that the fish can be held hanging with its head upwards and tail downwards, while other parts are moved forward vertically and horizontally in relation to the fish.

We claim:

1. A method for automatically cleaning fish such as cod, said method comprising gripping the fish and subsequently cutting it open, first transversely behind the head from the belly of the fish and subsequently in its longitudinal direction along the belly, and finally removing the entrails, characterized in that the fish is gripped in its eye sockets with its belly upwards and being held rotatably substantially about an axis extending therethrough, that the fish is displaced parallel to its axis and is moved with its back supported towards a chin lifting means, which presses the head of the fish backwards, and past a throat cutting means for cutting the fish transversely, that the fish is then turned and moved further head foremost and belly upwards and further round along a curved descending path, that the fish is thereby bent backwards and moved into engagement with a belly distending means which during continued forward movement of the fish passes into the fish along the inside of the belly, and with a knife which in immediate connection to the belly distending means cuts open the belly longitudinally, that the fish is then moved further hanging down freely with the cut open belly facing forwards, and that the entrails are then pulled out by pulling the fish over an entrails scraping means.

2. A method for automatically cleaning fish according to claim 1, characterized in that the fish is moved head first and belly downwards the entrails scraping means, an entrails scraper being inserted in a first position into the belly and its U-shaped end being positioned in abutting engagement with the back of the fish, and inner arms being engaged with the inner side surfaces of the belly at the same time as outer arms engage with and support the outer side surface of the belly, that during the continued forward movement of the fish and in a specific second position of the scraper, the arms are moved downwards and outwards in relation to the fish so as to cut the entrails from the sides of the belly, at the same time as the entrails scraper cuts them from the back, and that in a specific third position of the scraper when its end reaches the bottom of the belly, it is rotated approximately 180° and a cutting edge on the inside of the end cuts the entrails completely away from the belly.

3. A method according to claim 2, characterized in that the position of the entrails scraper in relation to the fish and its movement is controlled in relation to the eye or nose of the fish.

4. A method according to claim 2, characterized in that the arms of the entrails scraping means are moved outwards and downwards approximately 35° from a horizontal plane along the fish.

5. A method and apparatus for automatically cleaning fish according to claim 1, wherein the fish is gripped through its eye and hangs in a vertical position with its head upwards and tail downwards, the entrails scraping means being moved up and down in a vertical plane.

6. An apparatus for automatically cleaning fish, such as cod, characterized in that it comprises an endless conveyor having fishhead directing means for directing the head of the fish transversely to the direction of movement of the conveyor and with the chin part of the head facing upwards, the conveyor having gripping means for engaging with the eye hollows of the fish and for holding the head of the fish rotatably about an axis extending transversely through the eye hollows and in the direction of movement of the conveyor, back supporting means for supporting the fish substantially along a line extending transversely to the longitudinal direction of the fish in front of the centre of gravity of the fish, throat cutting means for partly cutting the throat of the fish transversely during the continued forward movement of the fish, means to turn the gripping means approx. 90° in relation to an axis extending at right angles to the conveyor after the cutting of the throat, the head of the fish then being foremost in the direction of movement, belly cutting means for cutting open the belly longitudinally during the transfer of the fish to the bottom side of the conveyor, and an entrails scraping means, the fish being pulled against and slid over the entrails scraping means, while hanging freely down below the conveyor.

7. An apparatus according to claim 6, characterized in that the fishhead directing means comprise a substantially horizontal feeding plate extending to a position immediately adjacent to the path of the gripping means, first and second substantially vertical guiding plates defining a narrowing passage corresponding to the cod heads and having abutment means for stopping the fish with its head protruding from the feeding plate and into the path of the gripping means.

8. An apparatus according to claim 7, characterized in that the first guiding plate is positioned foremost in relation to the path of the gripping means and has a slot for passage of these, while the other guiding plate is suspended elastically and yieldingly for swinging away from the path of the gripping means when being actuated thereby.

9. An apparatus according to claim 8, characterized in that the gripping means comprise a tapered pin which is adapted to pass through one eye hollow of the fish and out through the other eye hollow, as well as a spring-biassed locking flap for swinging at right angles to the pin at the tapered end thereof, when said end has passed through the fish, and the other guiding plate has been swung away.

10. An apparatus according to claim 6, characterized in that the throat cutting means comprises a first movably mounted bifurcated knife and a second fixed, oblong, movably mounted and curved knife, said first bifurcated knife being V-shaped with a sharp cutting edge on its V-shaped inner side and being rotatable in an approximately horizontal plane about its one free end, and a guiding device which is rotatable in the same plane and interacts with the V-shaped knife via a guiding channel and is provided with a protruding curved rod at its free end, approximately at right angles to the guiding device.

11. An apparatus according to claim 10, characterized in that the throat cutting means are fastened to a joint mechanism which when actuated by the abutting means are pushed down into position in relation to each individual fish, the correct position being determined by a chin guiding plate, against which plate the chin part of the fish is pressed so as to simultaneously lift said plate.

12. An apparatus according to claim 11, characterized in that the belly cutting means comprise a curved, fixed channel towards which the belly of the fish is pulled, the longitudinal direction of the channel following the path of the fish, and the shape of the channel distending the belly of the fish outwards and slightly forwards in the direction away from the conveyor, the belly cutting means further comprising a belly distending means, which is positioned immediately downstream of the discharge end of the fixed channel and is adapted to pass into the belly cavity of the fish during the passage of the fish via a transverse throat cut, and to support the belly of the fish during the passage of a fixed knife for cutting open the belly longitudinally, the tail part of the fish being allowed to yield freely and thereby allowing automatic withdrawal of the belly distending means at the vent of the fish and stopping cutting at this position.

13. An apparatus according to claim 6, characterized in that the entrails scraping means against which the fish is pulled and slid along, comprises a U-shaped entrails scraper, which is movable about first and second horizontal axes; and the end of which is provided with an inner V-shaped cutting means, said end being rotatable about the second horizontal axis, and two outer and two inner arms which are movable in horizontal as well as in vertical direction.

14. An apparatus according to claim 6, characterized in that the entrails scraping means comprises a U-shaped entrails scraper which is movable about a horizontal axis, while its end is movable approx. 180° about a horizontal axis via a joint mechanism, and the end being provided on the inside with an approximately V-shaped cutting edge with a pair of inner and outer arms which can be moved about vertical and horizontal axes, the movements of the entrails scraping means being synchronized with the position of the fish in the apparatus in relation to the eye or nose of the fish.

15. An apparatus according to claim 6, characterized in that it comprises a feeding mechanism with a guiding channel placed in the first specific position, a locking gate connected thereto for moving the guiding channel to a second fixed position when the gate is opened, fish which are moved along the channel being engaged by the gripping means.

* * * * *